United States Patent

Balugani et al.

[15] 3,660,771

[45] May 2, 1972

[54] DEMODULATOR FOR TWO-FREQUENCY COMMUNICATION SYSTEM

[72] Inventors: Fabio Balugani; Paolo Fornasiero, both of Milan, Italy

[73] Assignee: Societa' Italiana Telecomunicazioni Siemens S.p.A., Milan, Italy

[22] Filed: Nov. 30, 1970

[21] Appl. No.: 93,537

[30] Foreign Application Priority Data

Dec. 3, 1969 Italy ................................25269 A/69

[52] U.S. Cl. ................................329/104, 178/66, 325/320, 329/126

[51] Int. Cl. ........................................H04l 27/14, H03d 3/04

[58] Field of Search ..................329/104, 110, 126; 325/320, 325/325; 178/66

[56] References Cited

UNITED STATES PATENTS

| | | | |
|---|---|---|---|
| 3,371,334 | 2/1968 | Asher et al. | 325/320 UX |
| 3,502,995 | 3/1970 | Cottatellucci et al | 329/126 |
| 3,522,539 | 8/1970 | Levine et al. | 329/126 X |

*Primary Examiner*—Alfred L. Brody
*Attorney*—Karl F. Ross

[57] ABSTRACT

At the receiving end of a communication system utilizing a lower keying frequency $f_1$ and a higher keying frequency $f_2$ for the transmission of information, a counter with N/2 stages is stepped by clock pulses having a cadence $Nf_2$. The incoming two-frequency wave is converted into a train of signal pulses occurring at the end of each half-cycle, these signal pulses being used to reset the counter which therefore does not generate an output if the signal pulses follow one another at a rate equal to or faster than $½f_2$. With lower incoming frequencies, the counter sets a flip-flop which is then reset by the next signal pulse and which thereby generates a stepped wave to yield, on integration, a definite DC voltage.

6 Claims, 5 Drawing Figures

INVENTORS:
Fabio Balugani
Paolo Fornasiero

BY Karl F. Ross
Attorney

INVENTORS:
Fabio Balugani
Paolo Fornasiero

BY

Karl G. Ross
Attorney

DEMODULATOR FOR TWO-FREQUENCY COMMUNICATION SYSTEM

Our present invention relates to a demodulator for a communication system of the type wherein two keying frequencies are alternately generated to transmit information, e.g. as dots and dashes of the Morse code or as marks and spaces of the Baudot code.

A demodulator used at the receiving end of such a transmission system should be capable of discriminating between two relatively closely spaced keying frequencies in order to reduce the required bandwidth. Conventional demodulators, satisfying this requirement only imperfectly, include limiters, differentiators and rectifiers to derive from the incoming two-frequency oscillation a signal pulse whenever that oscillation goes through zero, the cadence of these pulses thus being double the momentary keying frequency. The signal pulses are used to trip a monostable circuit, or monoflop, whose relaxation time should be as close substituted possible to a half-cycle of the higher of the two keying frequencies so that the ratio between pulses and gaps appearing at the off-normal 1*output l*) considerably larger for the higher frequency than for the lower one. The usual monoflops, however, have a recovery period approximately equaling their relaxation time so that the pulse-to-gap ratio cannot be much greater than 1 : 1 for the higher of the two keying frequencies.

Thus, if the two keying frequencies are $f_1$ and $f_2$ (with $f_1 < f_2$), corresponding to respective cycle lengths or periods $T_1 = 1/f_1$ and $T_2 = 1/f_2$, the magnitudes of the integrated output voltages $V_1$ and $V_2$ of the monoflop can be expressed by the relationship $$V_1/V_2 = (T_1 - 2T/T_2 - 2T) \cdot (T_2/T_1) \qquad (1)$$

where T is the relaxation time of the monoflop. If it were possible to make this relaxation time equal to the cadence or recurrence rate $2f_2$ of the signal pulses derived from the higher keying frequency, i.e. if $2T = T_2$, the ratio $V_1 : V_2$ would become infinite. For the aforestated practical considerations, however, the optimum value realizable for $T$ is approximately $T_2/4$; this value, if substituted in equation (1), yields $$V_1/V_2 = 2 - (T_2/T_1) = 2 - (f_1/f_2) \qquad (2)$$

If the keying frequencies are $f_1 = 390$ Hz and $f_2 = 450$ Hz, the insertion of these values in equation (2) gives a voltage ratio voltage ratio of $V_1/V_2 = 1.15$. This ratio, which is unalterable by amplification, is barely sufficient for positive discrimination between the two specified frequencies so that a larger bandwidth would be needed to ensure the accuracy of transmission.

It is, therefore, the general object of my present invention to provide an improved demodulator for the purpose set forth which discriminates with certainty between closely spaced keying frequencies, provided that the higher one of these frequencies has a known minimum value.

A more specific object is to provide a demodulator of this character which can be realized with integrated circuitry.

A demodulator according to my present invention comprises, like the conventional type of demodulator referred to above, input circuitry for deriving at least one and preferably two signal pulses from each cycle of the incoming oscillation, though more generally the number of such pulses per cycle could be any integer $k$. A timer measures an interval of $T_2/2$ (expressed in seconds if the frequency is given in Hertz) or, in the more general case, of $T/k = 1/kf_2$, starting with the occurrence of any signal pulse, the timer being resettable by any sufficient signal pulse to restart the measurement of that interval. If such subsequent signal pulse does not occur at or before the end of the measured interval of $1/kf_2$, the timer triggers a pulse generator to produce an output pulse whose duration substantially equals the time difference $1/kf_1 - 1/kf_2$ and which, in tHe preferred embodiment described in detail hereinafter, may be a flip-flop reset by the next signal pulse so that the length of its output pulses in the presence of keying frequency $f_1$ equals $(T_1 - T_2)/k$.

According to a more specific feature of my invention, the timer is designed as a pulse counter of N/$k$ (preferably N/2) stages stepped by clock pulses recurring at a cadence of N$f_2$. If this counter is not reset by a signal pulse on or before being fully loaded, its output in response to the next clock pulse triggers the aforementioned pulse generator to indicate that the incoming frequency is lower than $f_2$. Since this pulse generator is never triggered with frequencies of magnitude $f_2$ or greater, its output voltage is invariably zero in the presence of the higher keying frequency and acquires a finite value for any lower frequency differing from the cutoff frequency $f_2$ by at least $k$ clock cycles. Thus, the ratio N/$k$ determines the resolution of the frequency demodulator.

According to another advantageous feature of my invention, the input circuitry used to derive the signal pulses from the incoming oscillation includes a logic network with one or more inverters to generate a slightly delayed image of the squared oscillation, this oscillation then being logically combined with its delayed image to generate a pulse of a width equaling the delay. The necessary logic gates can be incorporated, along with other elements of the demodulator, in an integrated circuit.

The present invention will become more readily apparent from the following description, reference being made to the accompanying drawing in which.

Figure 1:
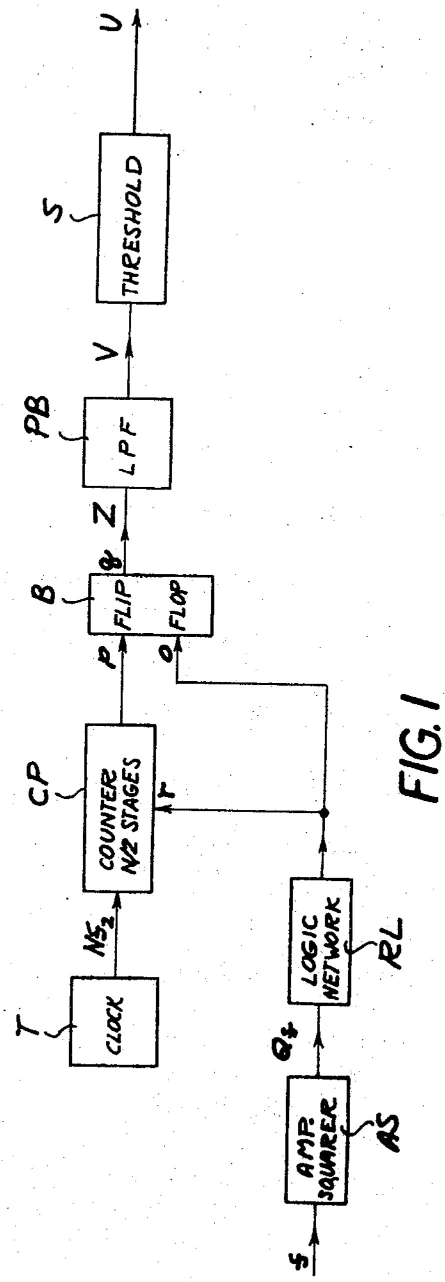
FIG. 1 is a block diagram of a discriminator embodying the invention.

The demodulator shown in FIG. 1 comprises a timer which includes a clock circuit T, generating a train of pulses with a cadence N$f_2$, which steps a counter CP having N/2 stages. Resetting input $r$ of counter CP receives a series of signal pulses P from an input circuit including an amplifier-squarer AS and a logic network RL. Limiting amplifier AS converts an incoming oscillation $f$ into a square wave $Q_f$ from which the logic network RL derives the signal pulses P in a manner more fully described hereinafter with reference to FIG. 3.

The output of counter CP is fed to a setting input $p$ of a flip-flop B whose resetting input $o$ receives the signal pulses P from network RL. Pulses Z appearing in the set output $q$ of flip-flop B are integrated in a low-pass filter PB to generate a direct current voltage V, the latter being compared by a threshold device S with a predetermined reference level. Whenever voltage V exceeds that reference level, circuit S generates an output signal U.

Figure 2:
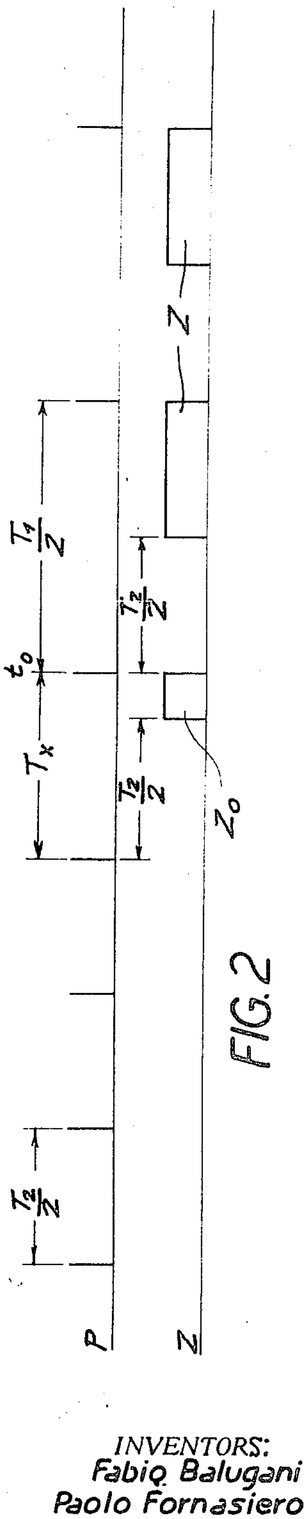
FIG. 2 is a set of graphs relating to the operation of the system of FIG. 1.

The operation of the system of FIG. 1 will be described with reference to FIG. 2 showing the series of signal pulses P and the output pulses Z of flip-flop B. In the left-hand portion of FIG. 2, thus during an initial transmission interval, the pulses P have a recurrence period equal to $T_2/2$ corresponding to the higher keying frequency $f_2$ alternating with the lower frequency $f_1$ in the input oscillation $f$ of FIG. 1. Every pulse P resets the counter CP which therefore returns to zero as soon as it has been fully loaded by the clock pulses from source T, its loading period being equal to the pulse period $T_2/2$. If the incoming frequency should for any reason be higher than $f_2$, the counter would prematurely reset to restart the count with each new signal pulse. In neither case, therefore, would an output from the counter reach the setting input $p$ of flip-flop B.

During a transition period $T_x$, the input frequency is shown to shift from $f_2$ to $f_1$ so that the pulse spacing increases beyond $T_2/2$ to a period $T_1/2$ corresponding to a half-cycle of the lower keying frequency. Toward the end of transition period $T_x$, therefore, counter CP becomes fully loaded and, in response to the next clock thereafter, sets the flip-flop B to generate a first rectangular pulse $Z_0$ in the output $q$ thereof, this pulse being foreshortened by the occurrence of the next signal pulse P at time $t_o$. The following signal pulses, having the spacing $T_1/2$, allow the full development of output pulses Z whose width equals half coincide difference $T_1 - T_2$ between the two keying-frequency cycles. Each pulse Z is terminated by a pulse P simultaneously resetting the counter CP.

Figure 4:
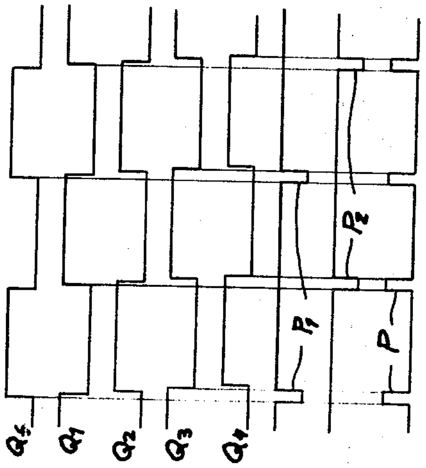
FIG. 4 is a set of graphs relating to the network of FIG. 3.
Figure 3:
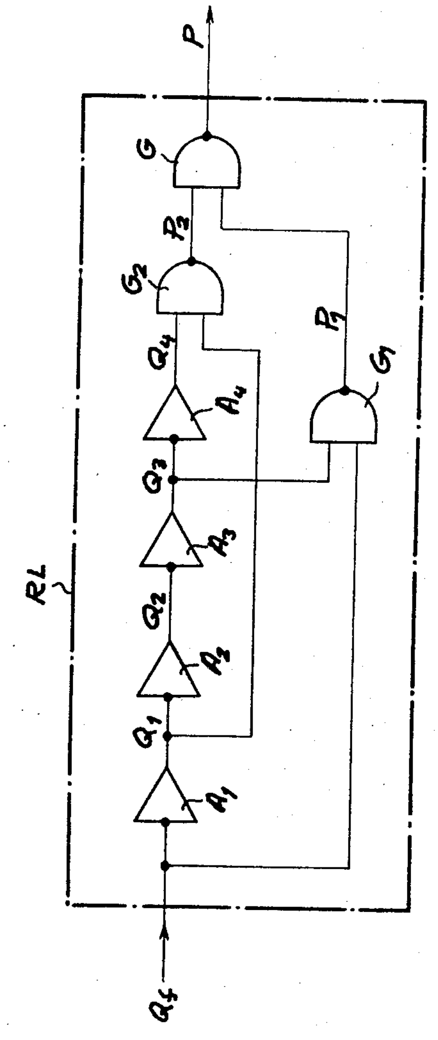
FIG. 3 is a circuit diagram for one of the blocks of FIG. 1.

The preferred mode of realization of logic network RL, illustrated in FIG. 3, comprises a chain of four cascaded inverters $A_1$, $A_2$, $A_3$, $A_4$ for the incoming square wave $Q_o$. These inverters, owing to their inherent circuit reactances, introduce a very slight delay (amounting to a small fraction of period $T_2/2$) so that the square-wave outputs $Q_1$, $Q_2$, $Q_3$, $Q_4$ thereof are relatively staggered as well as inverted, as illustrated in FIG. 4. Original wave $Q_f$ is logically combined with its delayed and inverted image $Q_3$ in a NAND gate $G_1$ producing a train of short pulse gaps $P_1$ which coincide with the leading edges of wave $Q_f$; waves $Q_1$ and $Q_4$ are similarly combined in a NAND gate $G_2$ to produce analogous pulse gaps $P_2$ coinciding with the trailing edges of wave $Q_f$. A combination of the outputs of NAND gates G and $G_1$ in a further NAND gate G gives rise to the pulses P delivered to inputs *r* and *o* of counter CP and flip-flop B.

Gates $G_1$, $G_2$ and G are representative of several logic circuits designed to derive the pulses P from the relatively staggered and inverted square waves $Q_f$, $Q_1$–$Q_4$.

The number N of clock pulses per cycle $T_2$ should be large enough to minimize the uncertainty due to the random phasing of the clock pulses with reference to the signal pulses P. Thus, the spacing of these clock pulses determines the maximum separation of two frequencies in the vicinity of $f_2$ which would permit a full loading of counter CP between successive zero crossings.

Naturally, a change in the number of active counter stages to alter the magnitude of N will accommodate different cutoff frequencies $f_2$; the same result could be obtained, of course, by varying the cadence of clock circuit T.

If only the pulse gaps $P_1$ or $P_2$ (or their inversions) were utilized, the system would generate only one signal pulse P per cycle so that the number of counter stages would have to be doubled for an otherwise identical mode of operation. The width of these pulse gaps has been exaggerated in FIG. 4, for the sake of clarity.

Figure 5:
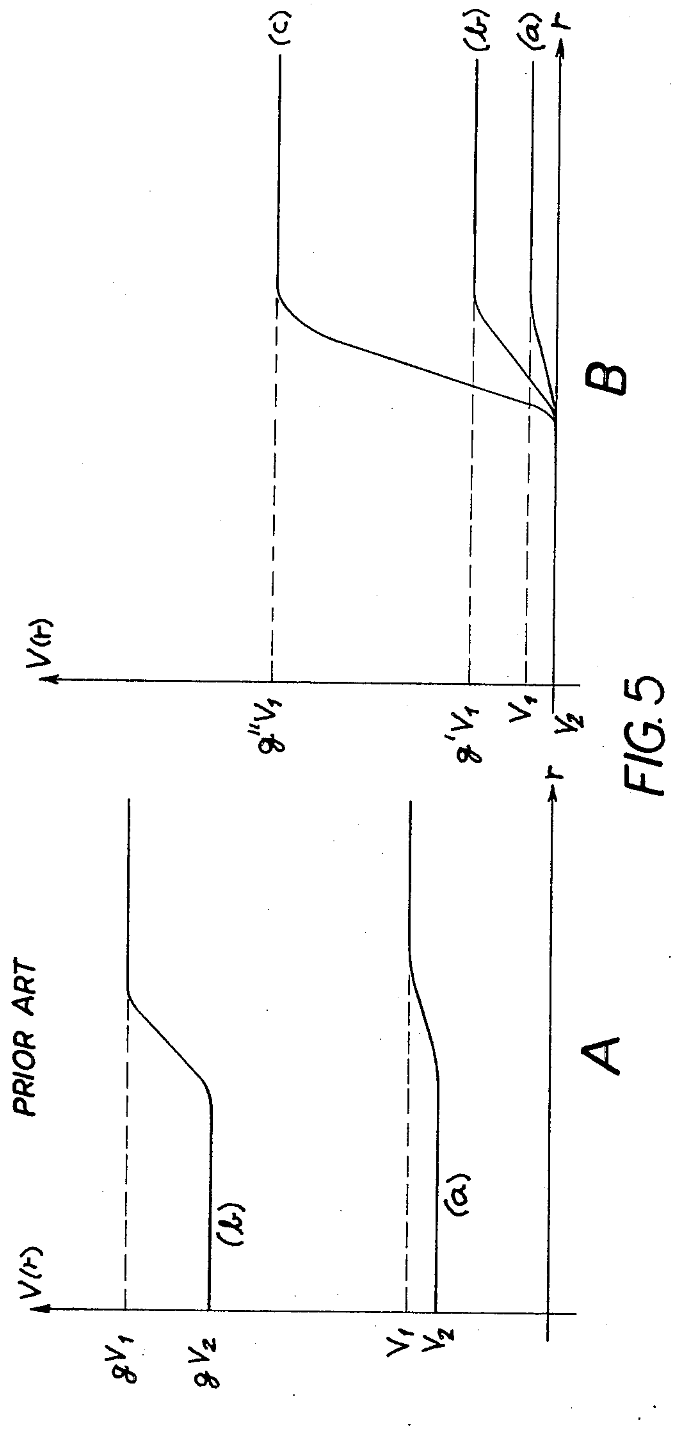
FIG. 5 shows comparative response curves for a conventional demodulator and for the system of FIG. 1.

In FIG. 5 we have shown a comparison between the output voltage $V(t)$ of a conventional demodulator of the type initially described, graph (A), and the same voltage as produced by the system of FIG. 1, graph (B). Curve (*a*) of graph (A) shows the voltage variation between levels $V_1$ and $V_2$ upon a changeover between a higher keying frequency $f_2$ = 450Hz and a lower keying frequency $f_1$ = 390Hz, in conformity with the ratio of 1.15 : 1 given above. Curve (*b*) of graph (A) shows the same ratio between voltages $gV_1$, $gV_2$ amplified with a gain *g*; such amplification, therefore, is without effect upon the signal-to-noise ratio of the system. As illustrated in graph (B), the voltage level $V_2$ is zero in the presence of frequency $f_2$ whereas the voltage level $V_1$, due to frequency $f_1$, is finite and may be amplified at will to magnitudes $g'V_1$, $g''V_1$, for the establishment of a desired signal-to-noise ratio.

Reference may be made to commonly owned application Ser. No. 36,252, filed May 11, 1970 by E. Angeleri and F. Balugani disclosing a system for generating such keying frequencies of, say, 390Hz and 450Hz by a selective combination of harmonically related pulse trains.

We claim:

1. In a communication system having means for transmitting information by the alternation of a relatively low keying frequency $f_1$ with a relatively high keying frequency $f_2$, a demodulator for said information comprising:
   - receiving means for an oscillation containing said frequencies $f_1$ and $f_2$;
   - input circuitry for deriving *k* signal pulses per cycle from said oscillation, *k* being an integer;
   - timing means connected to said input circuitry for measuring an interval of $1/kf_2$ from the occurrence of any signal pulse, said timing means being resettable to zero by any subsequent signal pulse for restarting the measurement of said interval;
   - and pulse-generator means connected to be triggered by said timing means upon the end of a measured interval of $1/kf_2$ preceding the occurrence of such subsequent signal pulse for producing an output pulse of a duration substantially equaling the time $1/kf_1 - 1/kf_2$.

2. A demodulator as defined in claim 1 wherein said timing means comprises a source of clock pulses of cadence $Nf_2$ and a counter for said clock pulses with $N/k$ stages, N being an integer substantially greater than *k*.

3. A demodulator as defined in claim 2 wherein $k = 2$.

4. A demodulator as defined in claim 3 wherein said circuitry comprises a squarer for said oscillation, inverter means for generating an image of the squared oscillation delayed with reference to the latter by a small fraction of a cycle, and gate means for logically combining said squared oscillation with its delayed image.

5. A demodulator as defined in claim 2 wherein said signal-repeating means comprises a flip-flop settable by the output of said counter and connected to said input circuitry for resetting by the next-following signal pulse.

6. A demodulator as defined in claim 5, further comprising integrating means connected to said flip-flop for receiving the output pulses thereof.

* * * * *